United States Patent
Smolyar et al.

(10) Patent No.: US 7,280,842 B2
(45) Date of Patent: Oct. 9, 2007

(54) WIRELESS COMMUNICATION DEVICE AND METHOD FOR COMMUNICATING IN SITE SELECTION DIVERSITY MODE

(75) Inventors: Lev Smolyar, Haifa (IL); Itzhak Bergel, Givat-Shmuel (IL)

(73) Assignee: Marvell International Ltd., Hamilton (BM)

( * ) Notice: Subject to any disclaimer, the term of this patent is extended or adjusted under 35 U.S.C. 154(b) by 624 days.

(21) Appl. No.: 10/322,365

(22) Filed: Dec. 17, 2002

(65) Prior Publication Data

US 2004/0116145 A1    Jun. 17, 2004

Related U.S. Application Data

(63) Continuation of application No. PCT/IB02/05410, filed on Dec. 16, 2002, which is a continuation-in-part of application No. 10/021,541, filed on Dec. 17, 2001, now abandoned.

(51) Int. Cl.
*H04Q 7/20* (2006.01)
*H04B 7/216* (2006.01)
*H04B 7/10* (2006.01)

(52) U.S. Cl. ............... 455/525; 455/517; 455/524; 370/342; 375/347

(58) Field of Classification Search ............ 455/524, 455/513, 522, 69, 436, 525, 101, 562.1, 560, 455/561, 550.1, 517; 370/335, 342, 347
See application file for complete search history.

(56) References Cited

U.S. PATENT DOCUMENTS

| | | | |
|---|---|---|---|
| 6,167,282 A * | 12/2000 | Hunsberger | 455/513 |
| 6,173,162 B1 | 1/2001 | Dahlman et al. | |
| 6,452,917 B1 * | 9/2002 | Leung | 370/342 |
| 6,483,866 B1 * | 11/2002 | Suzuki | 375/149 |
| 6,757,536 B1 * | 6/2004 | Kim et al. | 455/436 |
| 6,760,603 B1 * | 7/2004 | Scherzer et al. | 455/562.1 |
| 6,823,194 B2 * | 11/2004 | Haim | 455/522 |
| 6,842,616 B2 * | 1/2005 | Takano et al. | 455/435.2 |
| 6,862,275 B1 * | 3/2005 | Dabak | 370/342 |
| 2001/0008523 A1 * | 7/2001 | Song | 370/335 |
| 2002/0061731 A1 | 5/2002 | Takano et al. | |
| 2002/0061764 A1 * | 5/2002 | Kim et al. | 455/522 |
| 2002/0119799 A1 * | 8/2002 | Mouslsley et al. | 455/525 |
| 2002/0128032 A1 * | 9/2002 | Fukui | 455/524 |
| 2002/0160721 A1 | 10/2002 | Kanemoto et al. | |
| 2002/0191582 A1 * | 12/2002 | Miya et al. | 370/342 |
| 2002/0198000 A1 * | 12/2002 | Voyer | 455/453 |
| 2003/0083069 A1 * | 5/2003 | Vadgama | 455/436 |
| 2003/0114179 A1 | 6/2003 | Smolyar et al. | |
| 2003/0114181 A1 * | 6/2003 | Lee et al. | 455/522 |

(Continued)

FOREIGN PATENT DOCUMENTS

DE    19909299    9/2000

(Continued)

*Primary Examiner*—Tilahun Gesesse (57) ABSTRACT

A wireless communication device receives CDMA signals and communicates with remote base stations in site selection diversity transmit (SSDT) mode. During communications with a primary base station, communication state parameters, such as signal to interference ratio (SIR) target values and carrier frequency estimates, are maintained for other base stations of an active set of base stations. The state parameters for communications with a selected base station are available for use after selection of a new base station. In one embodiment, the communication state parameters are used for the selection of a base from the active set.

25 Claims, 6 Drawing Sheets

U.S. PATENT DOCUMENTS

| | | | |
|---|---|---|---|
| 2004/0116142 A1* | 6/2004 | Wang et al. | 455/522 |
| 2004/0116146 A1* | 6/2004 | Sadowsky et al. | 455/525 |
| 2004/0248581 A1* | 12/2004 | Seki et al. | 455/450 |

FOREIGN PATENT DOCUMENTS

| EP | 0715423 | 6/1996 |
|---|---|---|
| EP | 1109330 | 6/2001 |
| EP | 1182803 | 2/2002 |
| WO | WO-00/65748 | 11/2000 |
| WO | WO-01/01602 | 1/2001 |
| WO | WO 01/01602 * | 1/2001 |
| WO | WO-01/20808 | 3/2001 |
| WO | WO-01/20808 A2 | 3/2001 |
| WO | WO-01/24568 | 4/2001 |
| WO | WO-02/45296 A1 | 6/2002 |
| WO | WO-03/052967 A1 | 6/2003 |

* cited by examiner

WIRELESS COMMUNICATION DEVICE AND METHOD FOR COMMUNICATING IN SITE SELECTION DIVERSITY MODE

CROSS-REFERENCE TO RELATED APPLICATIONS

This is a continuation of PCT Application entitled: WIRELESS COMMUNICATION DEVICE AND METHOD FOR COMMUNICATING IN SITE SELECTION DIVERSITY MODE, filed on Dec. 16, 2002, having international application Ser. No. PCT/IB2002/005410, which in turn is a Continuation-In-Part of U.S. patent application entitled "METHOD AND APPARATUS FOR GENERATING A QUALITY MEASURE TARGET VALUE BASED ON CHANNEL CONDITIONS", filed Dec. 17, 2001, having application Ser. No. 10/021,541, which is assigned to the same assignee as the present application and both of which are incorporated herein by reference.

TECHNICAL FIELD

The present invention pertains to wireless communications, and in some embodiments, to CDMA communications, and other embodiments, to wireless communication devices operating in site selection diversity transmit (SSDT) mode.

BACKGROUND

Code division multiple access (CDMA) is a technique for spread-spectrum digital communications used for many applications, including, for example, mobile communications. In CDMA systems, data signals are combined with a spreading waveform to form a coded signal for transmission. At the receiver, the received signal is combined with a similar spreading waveform to extract the data signals. The technique provides high data capacity by spreading signal energy over a wide bandwidth to increase bandwidth utilization and reduce the effects of narrow band interference. Multipath effects make synchronization more difficult since the wireless channel from a base station to a reception device may have several paths of different time-delays, which may vary due to the movement of the reception device.

Wireless communication devices (e.g., mobile stations), which communicate CDMA signals with remote base stations, often operate in a site selection diversity transmit (SSDT) mode for selection of base stations to communication with. One problem with SSDT mode is that some algorithms, such as power control and frequency estimation algorithms, are unable to quickly adapt to the quick changes in channel conditions that occur when transferring communications from one base station to another. This may result in poor performance, especially after the selection of a new primary base station for communication.

One specific problem area is power control. Mobile stations conventionally implement power control methods to minimize transmission power while maintaining desired performance levels. Conventional power control methods implement a nested loop structure having an outer loop and an inner loop to control transmit power. In the outer loop, the block error rate (BLER) of received data may be monitored and compared to a desired BLER. A signal to interference ration (SIR) target is then developed for the receiver based on the comparison. In the inner loop, a measured SIR for a received signal is compared to the SIR target. A power control message may then be generated for delivery to the transmitter based on the result of the SIR comparison (e.g., indicating whether transmit power modifications are desirable). A problem with this power control technique (and other similar methods) is that the BLER measurement is relatively slow and, therefore, the SIR target is not able to adapt quickly to changes in channel conditions. As may be appreciated, this may result in poor communication quality after a new base station is selected, until the transmit power may be readjusted.

BRIEF DESCRIPTION OF THE DRAWINGS

The appended claims are directed to some of the various embodiments of the present invention. However, the detailed description presents a more complete understanding of the present invention when considered in connection with the figures, wherein like reference numbers refer to similar items throughout the figures and:

DETAILED DESCRIPTION

Figure 1:
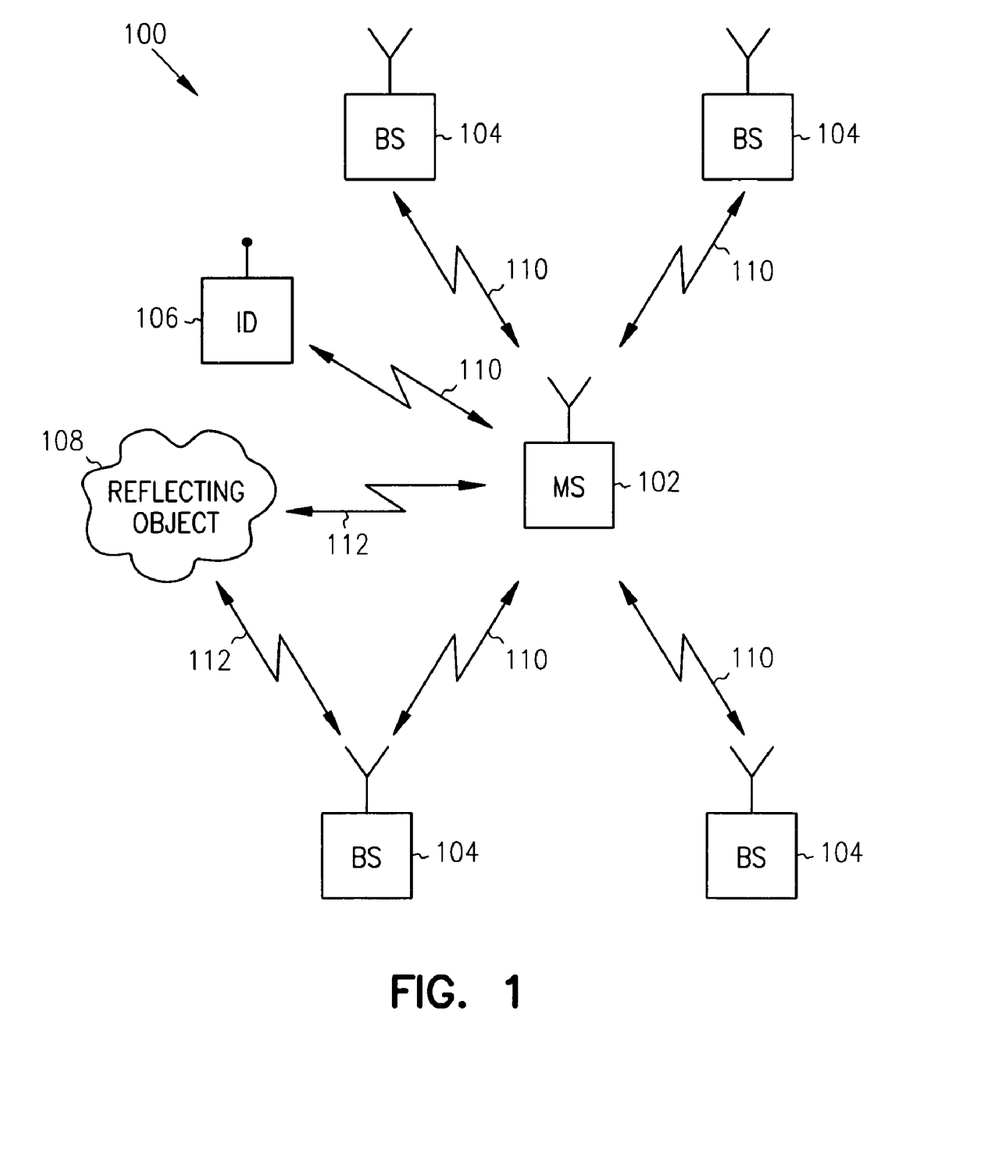
FIG. 1 illustrates an operational environment in which embodiments of the present invention may be practiced.

The present invention pertains to wireless communications, and in some embodiments, to code division multiple access (CDMA) communications, and other embodiments, to wireless communication devices operating in site selection diversity transmit (SSDT) mode. The present invention also pertains to wideband CDMA (WCDMA) communications. FIG. 1 illustrates an operational environment in which embodiments of the present invention may be practiced. Operational environment 100 includes mobile station 102 which may communicate with one or more base stations 104 over communication channels 110. Mobile station 102 may be implemented as any form of communication device or subsystem that may be used within a wireless communication system including, for example, a handheld communicator, a cellular base station transceiver, a satellite uplink, downlink, or crosslink transceiver, a transceiver within a terrestrial wireless link, a local multipoint distribution system (LMDS) or multipoint multichannel distribution system (MMDS) transceiver, a two-way radio, transceivers within wireless local area networks (LANs), metropolitan area networks (MANs), wide area networks (WANs), wireless local loop transceivers, and others.

Operational environment 100 may also include one or more reflecting objects 108, which may cause multipath reflections and frequency selective fading within the spectrum utilized by base stations 104 and mobile station 102. Operational environment 100 may also include one or more in-band interfering devices (ID) 106 which generate interference within the spectrum utilized by base stations 104 and mobile station 102. Due to reflecting objects 108 and interfering devices 106, base stations 104 and mobile station 102 may experience channel fading, multipath components, and interference conditions unique to a particular communication path between a base station and a mobile station. Communication channels 110 may be any form of wireless communication path, and may include, for example, CDMA and wide-band CDMA (WCDMA) communication channels.

In accordance with embodiments of the present invention, mobile station 102 receives CDMA signals and communicates with remote base stations 104 in site selection diversity transmit (SSDT) mode. During communications with a primary base station, communication state parameters, such as signal to interference ratio (SIR) targets, may be maintained for base stations of an active set of base stations. The communication state parameters may be used for transferring communications to one of the base stations of the active set. In one embodiment, the communication state parameters may be used for the selection of a base station from the active set. In another embodiment, the communication state parameters of the selected base station may be used for power control immediately after transferring communications. In yet another embodiment, the communication state parameters may include SIR targets and/or carrier frequency estimates, which may be maintained for base stations of the active set during communications with the primary base station. In this embodiment, when transferring communications to a selected base station of the active set, the SIR target and/or carrier frequency correction for the selected base station may be used immediately after transferring communications.

In an alternate embodiment, communication state parameters for the base stations of the active set may be calculated when this station is selected for communication. When a base station is selected for transferring communications, the communication state parameters for the selected base station may be updated for subsequent use after transferring communications.

The active set of base stations may include any base station that may be considered by a mobile station for transferring communications. The active set of base stations may include any base station of the system from which the mobile station may be capable of communicating with. The base stations of the active set may be determined from power level measurements of associated pilot channels. In accordance with one embodiment of the present invention, a base station of the active set may be selected for transferring communications based on channel state parameters. This is unlike conventional systems, which select base stations for transferring communications solely based on power level measurements.

Accordingly, improved wireless communications may be achieved. A base station having better error performance may be selected for transferring communications because maintained SIR targets and/or carrier frequency estimates may be used for base station selection. Improved communications may be achieved more quickly after transferring communications by use of the SIR target maintained for the selected base station. Furthermore, a more accurate power control message based on the maintained SIR measurements may be quickly generated after transferring communications to a selected base station. Furthermore, improved communications may be achieved more quickly after transferring communications because carrier frequency offset may be quickly corrected thereafter.

In one embodiment, SIR target approximations may be based on channel conditions, including a number of signal paths and/or speed of the mobile station. In one embodiment, a primary base station may be chosen based at least on signal to noise ratios (SNRs) of the base stations. In one embodiment, a plurality of SIR targets may be maintained (e.g., one target for each of the base stations of the primary set). In an alternate embodiment, a SIR target for a particular base station may be updated when the base station is the primary base station and held constant for base stations that are not the primary base station. The SIR targets may be determined by using one or more channels, such as the dedicated physical data channel (DPDCH), the dedicated physical control channel (DPCCH) and/or a common pilot channel (CPICH) of a WCDMA system. Alternatively, the SIR target for non-primary base stations may be updated using at least in part, a channel such as the DPCCH and/or CPICH channel that may be constantly transmitted by the particular base station.

Figure 2:
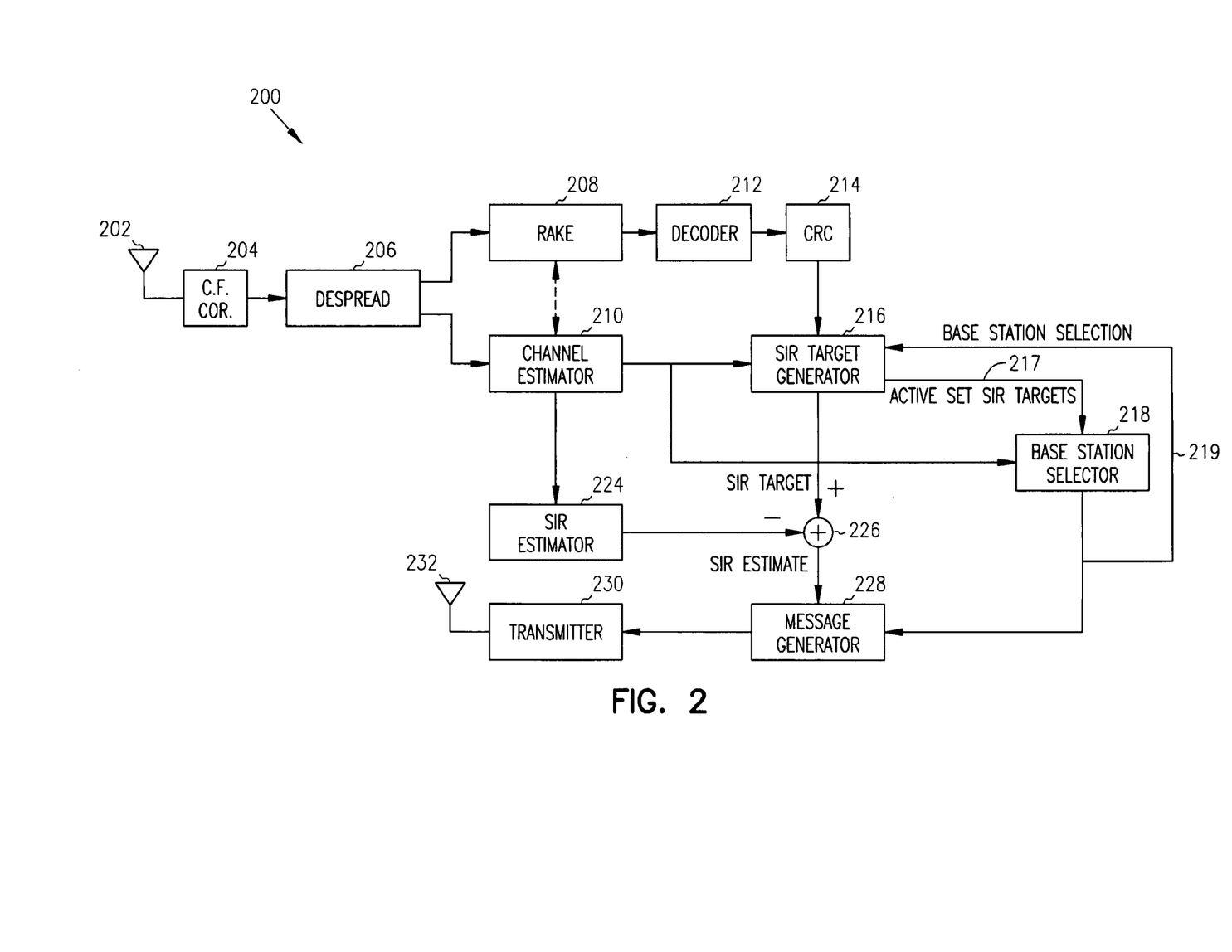
FIG. 2 is a block diagram of a wireless communication device in accordance with an embodiment of the present invention.

FIG. 2 is a block diagram of a wireless communication device (WCD) in accordance with an embodiment of the present invention. WCD 200 may be suitable for use as mobile station 102 (FIG. 1) although other devices are also suitable. WCD 200 may be used within a communication system implementing various communication techniques, including code division multiple access (CDMA) techniques as well as wide-band CDMA (WCDMA). WCD 200 may be implemented as either a mobile communicator or a base station transceiver within a communication system. When WCD 200 is implemented as a mobile communicator, receive antenna 202 may receive spread spectrum CDMA signals from one or more remote base stations. Despreader 206 despreads one or more of the signals using CDMA despreading techniques. Rake receiver 208 isolates various multipath components associated with a particular base station and may combine the components coherently. Decoder 212 decodes the resulting signal. Cyclic redundancy check (CRC) element 214 may use decoded signal information from decoder 212 to detect and quantify errors (e.g., as percentage of CRC errors) within WCD 200. Channel estimator 210 may processes the despread information to estimate channel parameters for the corresponding channel. SIR estimator 224 may estimate a SIR of the received signal using channel parameters determined by channel estimator 210. Any technique, including conventional techniques, for estimating a SIR from channel estimates may be suitable.

SIR target generator 216 generates a SIR target based on channel estimates from channel estimator 210 and performance estimates from CRC element 214. Embodiments of the present invention may use any conventional SIR target generation technique. At least one embodiment of the present invention may use the SIR target generation approach described in U.S. patent application entitled "METHOD AND APPARATUS FOR GENERATING A QUALITY MEASURE TARGET VALUE BASED ON CHANNEL CONDITIONS", filed Dec. 17, 2001, having application Ser. No. 10/021,541, which is assigned to the same assignee as the present application and which is incorporated herein by reference. In accordance with embodiments of the present invention, SIR target generator 216 may also generate active set SIR targets 217 from channel estimates. Active set SIR targets 217 may represent instantaneous SIR targets for base stations of the active set. This is described in more detail below.

The SIR target generated by SIR target generator 216 may be compared with the SIR estimate provided by SIR estimator 224 in comparison unit 226. Message generator 228 may then generate a message, including a power control message, based upon the comparison results. The message may be transmitted to a remote base station using transmitter 230 and transmit antenna 232. A similar approach may be used when WCD 200 is implemented as a base station, although receive antenna 202 may receive CDMA signals from one or more remote users rather than one or more remote base stations. Receive and transmit antennas 202, 232 may be replaced by a single antenna with the addition of duplexing functionality. Receive and transmit antennas 202, 232 may be almost any type of antenna suitable for receiving and transmitting frequencies used by WCD 200. In one embodiment, receive and transmit antennas 202, 232 may be comprised of either a single or separate dipole antennas, although other types of antennas are also suitable.

In at least one embodiment of the present invention, SIR targets generated for base stations of the active set are used to support a site selection diversity transmit (SSDT) mode of operation. In this mode, a mobile station may select one of a number of different base stations to transmit to the mobile station at a particular time. For example, when the channel from one base station is fading, a mobile station operating in SSDT mode may switch to another base station whose channel may not be fading. As a result of the transition (i.e., transferring communications) from one base station to another, the channel conditions of the new base station may often be significantly different from the channel conditions of the previous base station. If the SIR target of the previous base station were used for receipt of communications from the new base station, a relatively large SIR target error could result. In accordance with embodiments of the present invention, a relatively quick adjustment of the SIR target may be made for communications with the new base station. In one embodiment, a mobile station maintains SIR targets for each candidate base station during normal operation. Thus, an approximate SIR target for a new base station may be available for use at the time the new base station is selected.

In the past, mobile stations operating in SSDT mode would typically select a base station based on the total power received from each candidate base. However, the performance of a receiver (e.g., BLER, etc.) may not be a function of receive power alone, but may also be a function of other channel parameters. Disregarding this fact may result in a transition to a base station that has a higher received power, but may result in a lower performance level. Therefore, in at least one embodiment of the invention, a mobile station uses SIR targets that are calculated using estimated channel parameters as part of a base station selection criterion in SSDT mode.

CRC unit 214 may estimate almost any type of performance information that may be useful for generating the SIR target for the primary base station by target generator 216. This may include, for example, block error rate, bit error rate, symbol error rate, and other performance measures. Channel estimator 210 may estimate almost any form of channel information that may be used by SIR target generator 216 to determine SIR targets. This may include, for example, the number of paths in the channel, the path strengths, mobile velocity, path fading rates, symbol energy variances, variances between symbols of different blocks, variance of total block energy, and/or others. In addition to the channel parameters used by SIR target generator 216, channel estimator 210 may also estimate almost any other channel parameters that may be required by SIR estimator 224 or other functions within WCD 200.

WCD 200 may also include base station selector 218 which may select a base station for transferring communications as part of SSDT mode operations. Base station selector 218 may receive active set SIR targets 217 generated by SIR target generator 216 and/or channel estimates provided by channel estimator 210. Base station selector 218 may provide base station selection signal 219 for use by SIR target generator 216, an embodiment of which is described in more detail below. Base station selector 218 may also provide base station selection signal 219 to carrier frequency correction unit 204. Base station selector 208 may also provide a signal to message generator 228 for use in indicating the selected base station to a system controller.

Although WCD 200 is illustrated as having several separate elements, one or more of the elements may be combined and may be implemented by combinations of software-configured elements, such as processors including digital signal processors (DSPs), and/or other hardware elements. Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices.

Figure 3:
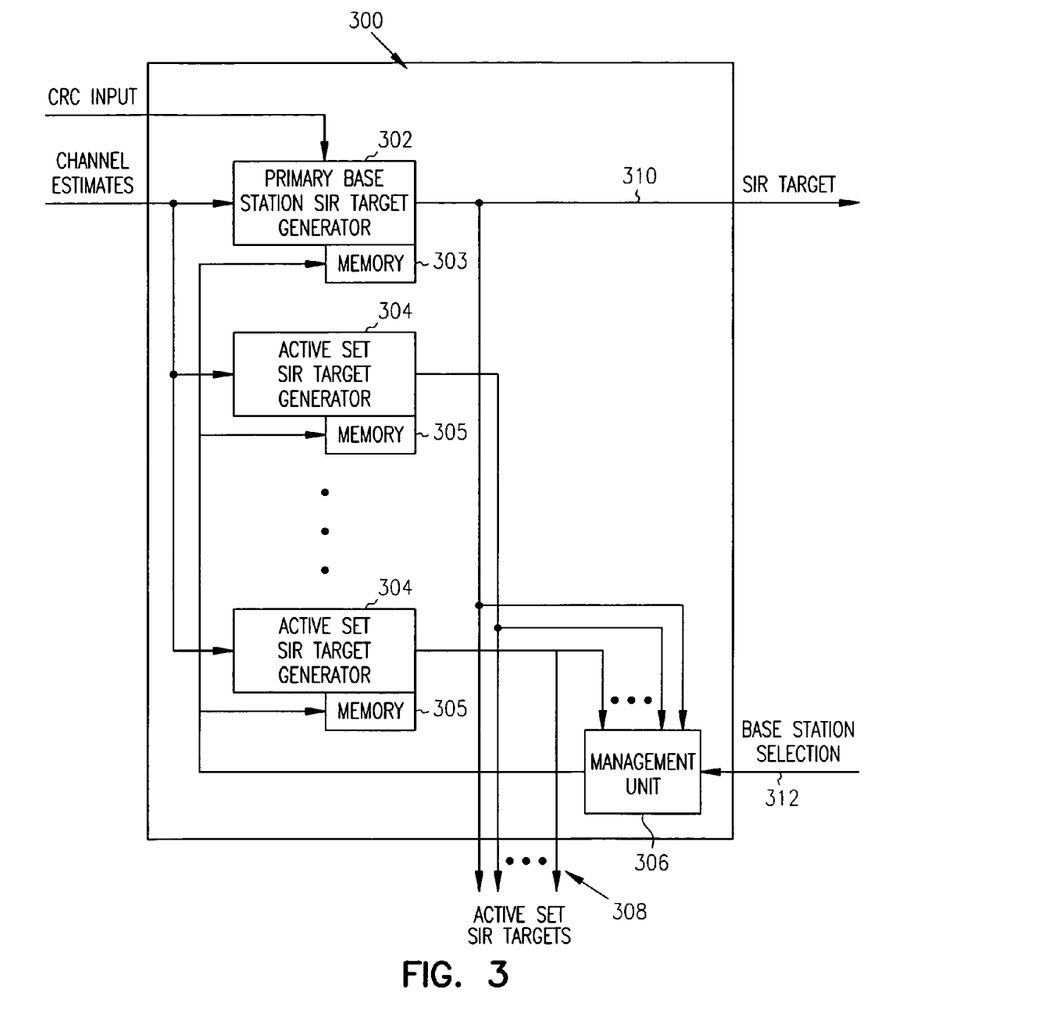
FIG. 3 is a block diagram of a SIR target generator in accordance with an embodiment of the present invention.

FIG. 3 is a block diagram of a SIR target generator in accordance with an embodiment of the present invention. SIR target generator 300 may be suitable for use as SIR target generator 216 (FIG. 2) although other devices may also be suitable. SIR target generator 300 includes primary base station SIR target generator 302 to generate SIR target value 310 during communications with a primary base station. SIR target generator 300 may also include one or more active set SIR target generators 304 to generate one of the active set SIR targets 308 for one or more base stations when the WCD is communicating with the primary base station. SIR target generators 302 and 304 may receive channel estimates from a channel estimator such as channel estimator 210 (FIG. 2), and in one embodiment, the channel estimator may provide channel estimates for more than one channel. For example, the channel estimator may provide channel estimates for a current channel with the primary base station, as well as channel estimates for channels with other base stations of the active set. In this embodiment, channel estimator 210 (FIG. 2) may include more than one functional channel estimator unit.

In one embodiment, a single one of active set SIR target generator 304 may be used. In this embodiment, the single active set SIR target generator 304 may generate SIR targets for the various base stations of the active set in a serial fashion. In an alternate embodiment, one active set SIR target generator 304 may be employed for each base station (or a predetermined number of base stations) of the active set in which SIR targets are to be generated.

SIR target generator 300 may include management unit 306, which receives base station selection signal 312. Base station selection signal 312 may be provided by base station selector 218 (FIG. 2). In one embodiment, when a base station is selected for transferring communications, management unit 306 provides the SIR target for the selected base station as SIR target value 310.

In one embodiment, active set SIR targets 308 generated by SIR target generators 302 and 304 may be used to select a base station for transferring communications. In this embodiment, base station selector 218 (FIG. 2) may receive active set SIR targets 308 from one or more of SIR target generators 304 and may select a base station for transferring communications using a selection criteria that considers the SIR for the candidate base station.

Figure 6:
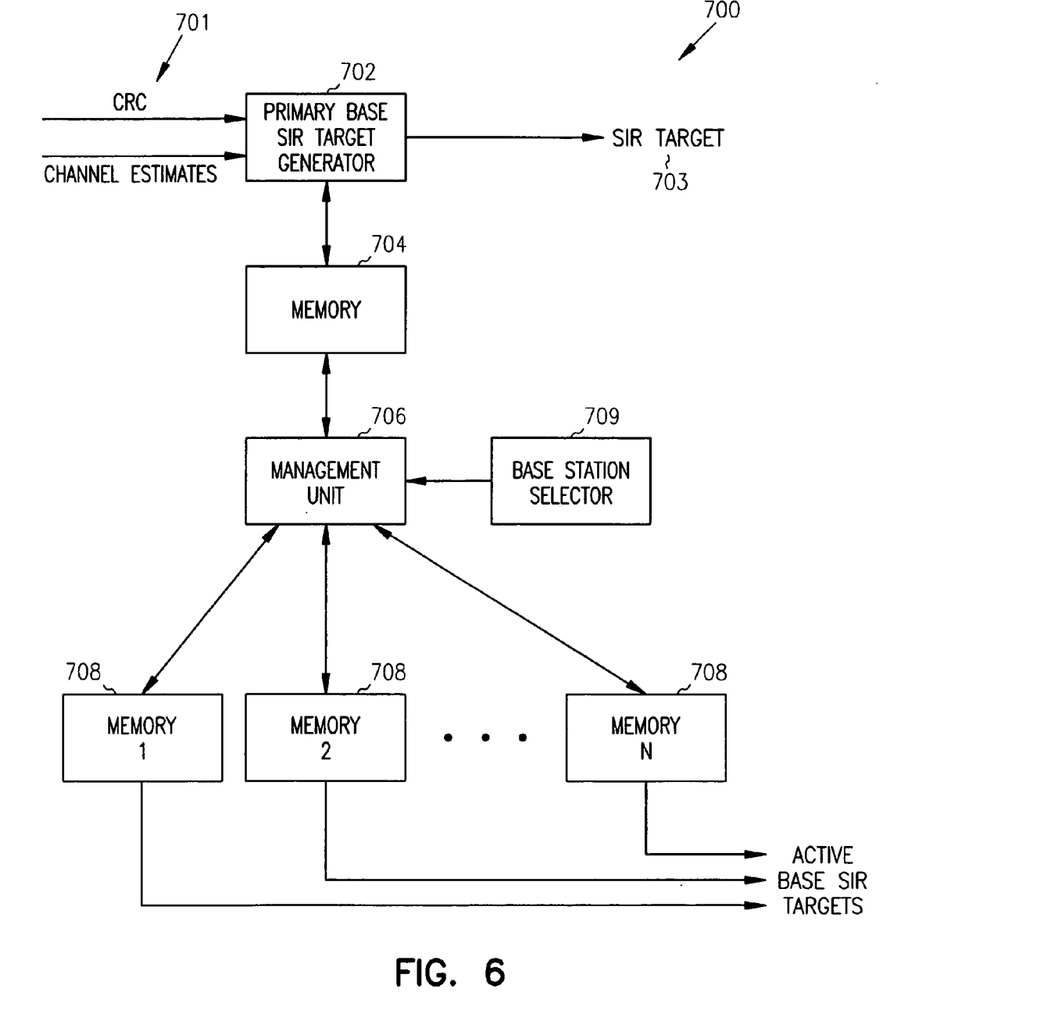
FIG. 6 is an illustration of SIR target management in accordance with an embodiment of the present invention.

FIG. 6 is an illustration of a SIR target generator in accordance with another embodiment of the present invention. SIR target generator 700 is another alternative suitable for use as SIR target generator 216 (FIG. 2), although other devices may also be suitable. Primary base SIR target generator 702 may use any conventional SIR target generation method to generate SIR target 703. Primary base SIR target generator 702 may use, for example, CRC and channel estimates 701. Primary base SIR target generator 702 may also use memory 704 to store the instantaneous SIR target. Each time a new primary base station is selected, management unit 706 may replace the contents of the active memory with data for selected base station data from base station selector 709. This may be done, for example, in one of two ways. In one embodiment, management unit 706 may simply take the old primary base station data (e.g., from memory 704) and may store it in the active base stations memory (e.g., one of memories 708), and may take the data that is relevant for the new selected base station (from one of memories 708) and store it in the primary base target generator memory (e.g., memory 704) so that SIR target generator 702 will now work with the new base station data.

In another embodiment, management unit 706 may also perform an update of the data from the active set memory (e.g. one of memories 708) once before putting the data in the SIR target generator memory (e.g., memory 704). This update may be done to reflect the passing time since the data's last update and whatever information available for the management unit at the specific time. For example, channel estimates, old primary base SIR target, etc. may be different and can be updated.

Accordingly, improved wireless communication may be achieved. A base station having better error performance may be selected for transferring communications because the maintained SIR measurements may be used for base station selection. Furthermore, improved communications may be achieved more quickly after transferring communications because the communication state parameters may be used after transferring communications.

Figure 4:
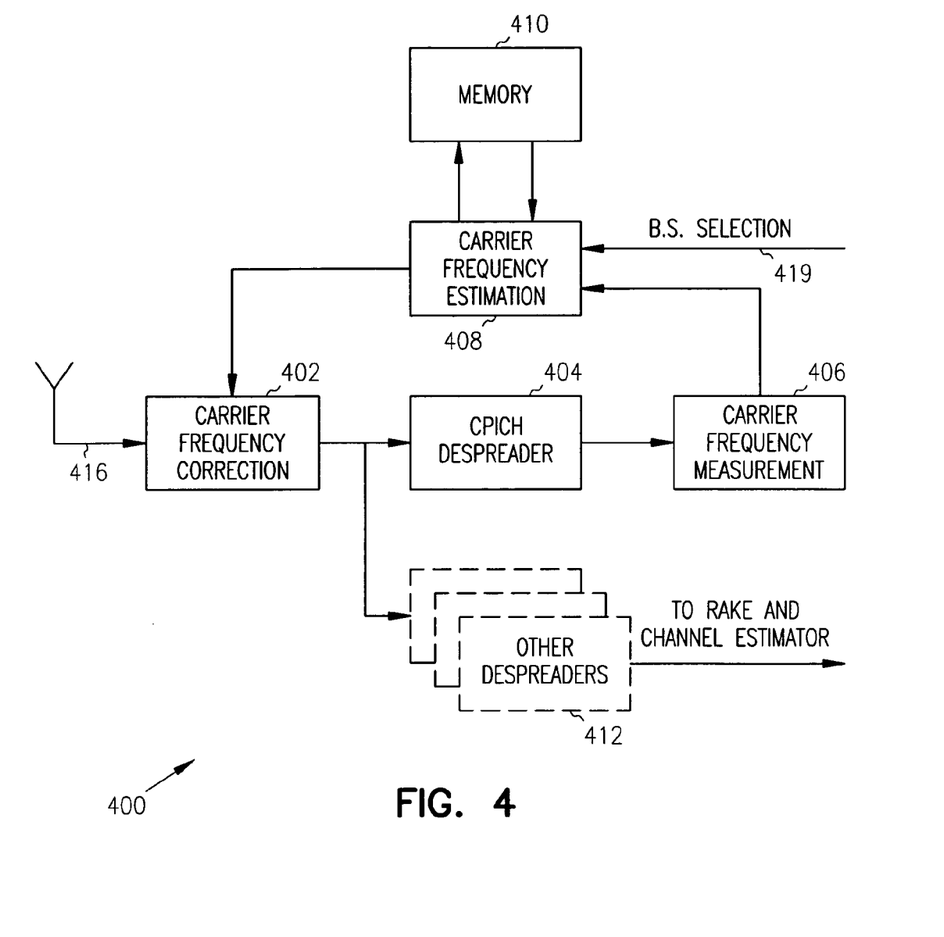
FIG. 4 is a block diagram of a carrier frequency correction unit in accordance with an embodiment of the present invention.

FIG. 4 is a block diagram of a carrier frequency correction unit in accordance with an embodiment of the present invention. Carrier frequency correction unit 400 may be suitable for use as carrier frequency correction unit 204 (FIG. 1) although other units may also be suitable. Carrier frequency correction unit 400 provides a correction to a carrier frequency by measuring the carrier frequency in carrier frequency measuring element 406 using an output of channel despreader 404. In one embodiment, channel despreader 404 may despread a pilot channel, such as a CPICH channel of a CDMA system, although other channels may be suitable for carrier frequency measurements. A carrier frequency estimation is generated by element 408 and may be stored in memory 410. In one embodiment, carrier frequencies are estimated for base stations of an active set of base stations. In this embodiment, despreader 404 may despread pilot channels for the base stations in a serial or sequential fashion allowing a carrier frequency estimation for base stations in an active set to be stored in memory 410. In this embodiment, when a base station from the active set is selected for transferring communications, a carrier frequency correction for the selected base station is immediately available allowing for correction of any carrier frequency offset. Accordingly, improved communications may be achieved substantially immediately after transferring communications. As illustrated in FIG. 4, other despreaders 412 correspond with despreader 206 (FIG. 2) and are not necessarily part of carrier frequency correction unit 400. CPICH Despreader 404 may correspond with Despreader 206 (FIG. 2) and is also not necessarily part of carrier frequency correction unit 400. Antenna 416 may correspond with antenna 202 (FIG. 2) and is also not necessarily part of carrier frequency correction unit 400. In one embodiment, base station selection signal 419 may be received by unit 400 from base station selector 218 (FIG. 2) to select a carrier frequency correction for a selected base station.

Figure 5:
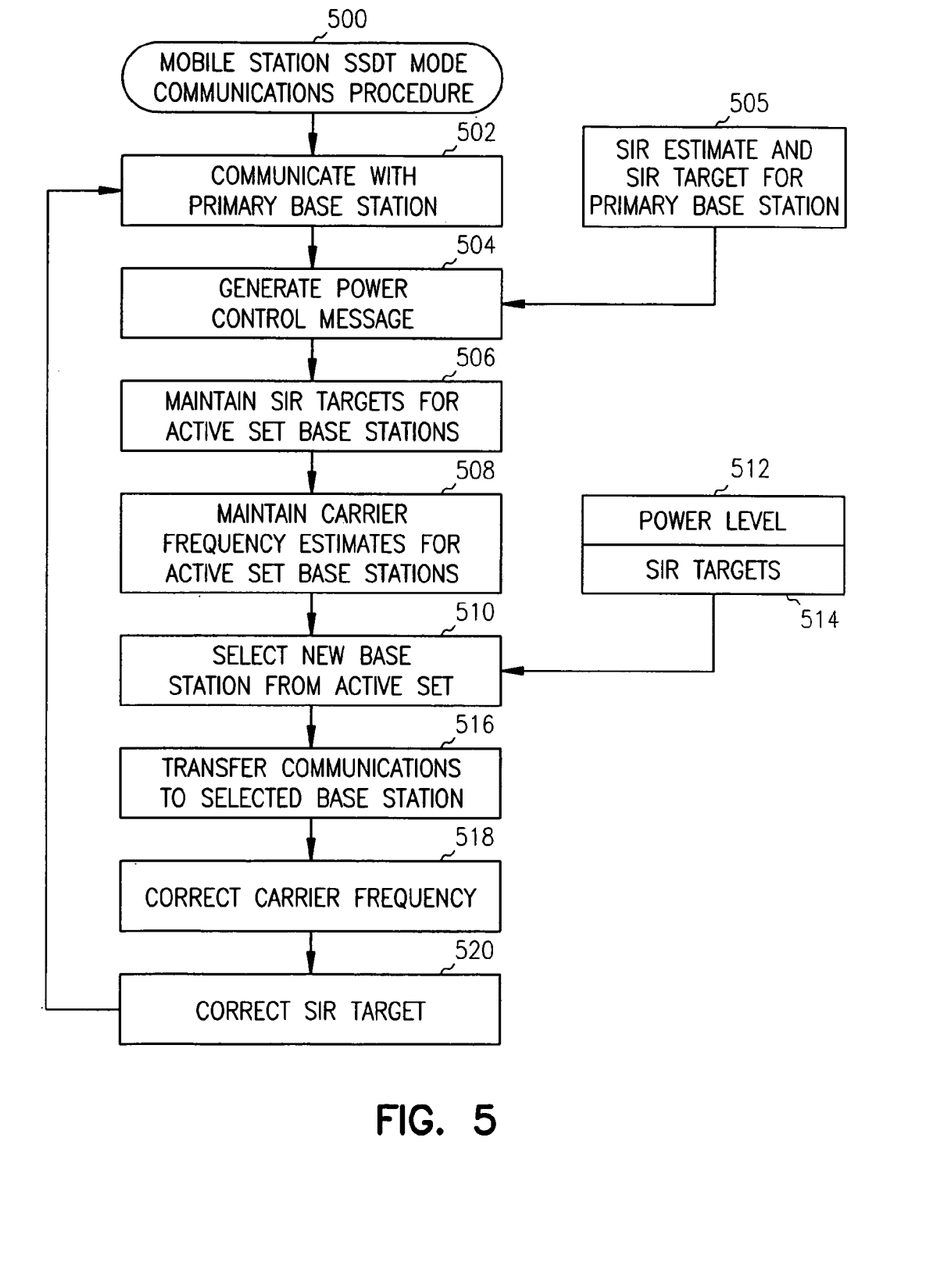
FIG. 5 is a flow chart of a communication procedure in accordance with an embodiment of the present invention.

FIG. 5 is a flow chart of a communication procedure in accordance with an embodiment of the present invention. Communication procedure 500 may be performed by a wireless communication device, such as WCD 200 (FIG. 2), as part of communication with base stations in an SSDT mode. Communication procedure 500 may also be performed by a wireless communication device, such as WCD 200 (FIG. 2), as part of selecting a base station for transferring communications. Although the individual operations of procedure 500 are illustrated and described as separate operations, one or more of the individual operations may be performed concurrently and nothing requires that the operations be performed in the order illustrated. The various operations of procedure 500 may be implemented by elements of WCD 200 as well as by processing elements and memory not separately illustrated that may be configured with software and/or firmware.

In operation 502, a WCD communicates with a primary base station. The WCD may communicate using CDMA techniques or may communicate in accordance with other conventional communication techniques. In operation 504, a power control message is generated. In one embodiment, the power control message is based on SIR estimate and SIR target 505 for the primary base station. The power control message may be generated in accordance with techniques discussed above for generating power control messages by WCD 200 (FIG. 2).

In operation 506, during communications with the primary base station of the active set, the WCD may maintain signal to interference ratio (SIR) target values for at least some base stations of the active set. The SIR targets may be generated by SIR target generator 300 (FIG. 3) and may correspond with active set SIR targets 308 (FIG. 3). In operation 508, carrier frequency estimates may be generated and maintained for at least some base stations of the active set during communications with a primary base station. These carrier frequency estimates may be stored in a memory and may be generated by a carrier frequency estimator such carrier frequency correction unit 400 (FIG. 4).

In operation 510, a base station is selected for transferring communications from the active set of base stations. Operation 510 may use power level measurements 512 of channels from the base stations, SNR measurements, and/or may use active set SIR targets 514 generated in operation 506. Operation 510 may be performed by a base station selection element, such as base station selector 218 (FIG. 2) and may be performed as part of SSDT mode operations. Operation 510 may include generating a base station selection signal, such as signal 219 (FIG. 2).

In operation 516, communications are transferred to the selected base station. In one embodiment, the SIR target from the selected base station may be used. After transferring communications to a new base station, the carrier frequency may be corrected in operation 518 using the carrier frequency estimations generated in operation 508. In operation 520, the SIR target may be corrected. After transferring communications to the new base station, the WCD may communicate with the new primary base station and operations 502 through 520 may be repeated. In one embodiment, a power control message may be based on the SIR target maintained for the selected base station allowing a more accurate power control message to be sent shortly after transferring communications without having to wait for error information to be generated.

The foregoing description of specific embodiments reveals the general nature of the invention sufficiently that others can, by applying current knowledge, readily modify and/or adapt it for various applications without departing from the generic concept. Therefore such adaptations and modifications are within the meaning and range of equivalents of the disclosed embodiments. The phraseology or terminology employed herein is for the purpose of description and not of limitation. Accordingly, the invention embraces all such alternatives, modifications, equivalents and variations as fall within the spirit and scope of the appended claims.

What is claimed is:

1. A method of communicating comprising:
   maintaining carrier frequency offset estimates and signal to interference ratio (SIR) target values for at least some base stations of an active set of base stations during communications with a primary base station;
   after transferring communications to a base station selected from the active set in which the carrier frequency offset estimates and the SIR target values are maintained, updating the SIR target values maintained for the selected base station; and
   correcting a carrier frequency for communications with the selected base station using the carrier frequency offset estimate maintained for the selected base station prior to the generation of an updated carrier frequency offset estimate for the selected base station, the updated carrier frequency offset estimate to be based on despreading of signals received from the selected base station after the transferring.

2. A method of communicating comprising:
   maintaining communication state parameters for at least some base stations of an active set of base stations, the communication state parameters including signal to interference ratio (SIR) target values and carrier frequency offset estimates for base stations of the active set;
   when transferring communications to a base station selected from the active set, updating the state parameters used for communicating with the state parameters maintained for the selected base station; and
   using at least one of the communication state parameters for immediate communications with the selected base station after the transferring,
   wherein the carrier frequency offset estimates for the base stations of the active set are maintained during communications with a primary base station, and
   wherein the method further comprises using the carrier frequency offset estimate of the selected base station for the immediate communications with the selected base station after the transferring and prior to the generation of an updated carrier frequency offset estimate for the selected base station, the updated carrier frequency offset estimate based on despreading of signals received from the selected base station after the transferring.

3. The method of claim 2 wherein using the communication state parameters includes using the maintained SIR target value for immediate communications with the selected base station after transferring communications to the selected base station.

4. The method of claim 3 wherein after transferring communications to a selected base station of the active set, the method further comprises using the SIR target maintained for the selected base station to generate a power control message to send to the selected base station before power control measurements with the selected base station are able to be made.

5. The method of claim 3 further comprising selecting a base station from the active set for transferring communications based on the SIR target values.

6. The method of claim 5 further comprising selecting the base station from the active set for transferring communications additionally based on pilot channel power level measurements for base stations of the active set.

7. The method of claim 2 wherein during communications with the primary base station of the active set, the method includes
updating the communication state parameters of the selected base station of the active set after the selected base station is selected for transferring communications; and
refraining from further updating the state parameters of other base stations.

8. The method of claim 2 wherein maintaining the communication state parameters comprises keeping the communication state parameters for base stations of the active set constant during communications with a primary base station, and updating the communication state parameters of a selected base station when the selected base station is selected.

9. The method of claim 2 wherein maintaining the communication state parameters includes updating the communication state parameters for more than one base station of the active set during communications with a primary base station.

10. The method of claim 2 wherein during communications with the primary base station, the method further comprises:
generating a SIR target for a current downlink channel from measured channel parameters;
generating a SIR estimate for the current downlink channel from measured channel parameters; and
combining the SIR target with the SIR estimate to generate a power control message for transmission to the primary base station,
wherein the current downlink channel is either a code division multiple access (CDMA) downlink channel or wideband CDMA (WBCDMA) downlink channel.

11. The method of claim 10 further comprising correcting the SIR target with a correction factor determined from error rate information, and wherein combining comprises combining the SIR estimate with the corrected SIR target to generate the power control message.

12. The method of claim 2 wherein the method is performed by a mobile station operating in site selection diversity transmit (SSDT) mode.

13. A communication device comprising:
a memory to store maintained carrier frequency offset estimates for base stations of an active set; and
a receiver to use the carrier frequency offset estimates for immediately communicating with a selected one of the base stations of the active set,
wherein the receiver comprises:
a carrier frequency offset estimator to determine the carrier frequency offset estimates for the base stations of the active set during communications with a primary base station; and
a carrier frequency correction unit to correct a carrier frequency for immediate communications with the selected base station using the carrier frequency offset estimate maintained for the selected base station after transferring communications to the selected base station and prior to the generation of an updated carrier frequency offset estimate for the selected base station, the updated carrier frequency offset estimate to be based on despreading of signals received from the selected base station after the transferring.

14. A communication device comprising:
a memory to store maintained communication state parameters for base stations of an active set, the communication state parameters including signal to interference ratio (SIR) target values and carrier frequency offset estimates for each base station of the active set; and
a receiver to use at least one of the communication state parameters associated with a selected base station of the active set for immediate communications after transferring communications to the selected base station,
wherein the receiver updates the communication state parameters for more than one base station of the active set during communications with a primary base station, and
wherein the carrier frequency offset estimate of the selected base station is used for the immediate communications with the selected base station after the transferring and prior to the generation of an updated carrier frequency offset estimate for the selected base station, the updated carrier frequency offset estimate to be based on despreading of signals received from the selected base station after the transferring.

15. The device of claim 14 wherein the receiver includes a SIR target generator to maintain the signal to interference ratio (SIR) target values for base stations of an active set, the SIR target value being used for immediate communications with the selected base station after transferring communications thereto.

16. The device of claim 15 wherein the receiver selects a base station from the active set for transferring communications based on the SIR target values and based on pilot channel power level measurements for base stations of the active set.

17. The device of claim 14 wherein the receiver further comprises a message generator wherein after transferring communications to a selected base station of the active set, the message generator uses the SIR estimate maintained for the selected base station to generate a power control message to send to the selected base station before power control measurements with the selected base station are able to be made.

18. The device of claim 14 wherein during communications with the primary base station of the active set, the receiver updates the communication state parameters of the selected base station of the active set after the selected base station is selected for transferring communications, and communicates with the selected base station after transferring communications using the updated communication state parameters.

19. The device of claim 14 wherein the receiver updates the communication state parameters for base stations of the active set once during communications with a primary base station, and updates the communication state parameters a second time for a base station of the active set selected for transferring communications.

20. A communication system comprising:
a dipole antenna to receive communications from a primary base station;
a channel estimator to generate channel estimates for a communication channel with the primary base station and generate channel estimates for channels with base stations of an active set of base stations;
a carrier frequency measurement unit to estimate carrier frequency offset measurements for the base stations of the active set;

a carrier frequency correction unit;

a signal to interference (SIR) target generator to generate SIR target values for the channel with the primary base station and the channels with the base stations of the active set;

a SIR estimator to generate a SIR estimate based on channel estimates for a current channel; and a base station selection unit to select a base station from the active set for transferring communications based on the SIR target values, wherein during communications with the primary base station, the SIR target values are maintained for base stations of the active set, and when transferring communications to one of the other base stations of the active set, the SIR estimate of the other base station is used for communications with the other base station after transferring communications, and wherein the carrier frequency correction element applies the carrier frequency offset estimate of the other base station for the immediate communications with the other base station after the transferring and prior to the generation of an updated carrier frequency offset estimate for the other base station, the updated carrier frequency offset estimate to be based on despreading of signals received from the other base station after the transferring.

21. The system of claim 20 further comprising a carrier frequency correction unit to maintain the carrier frequency offset estimates for other base stations of the active set during communications with a primary base station, and when transferring communications to one of the other base stations of the active set, to correct a carrier frequency of the other base station using the carrier frequency offset estimate for the other base station.

22. The system of claim 21 further comprising a message generator to generate a power control message based on the SIR estimate for the current channel and the SIR target value for the current channel.

23. An article comprising a storage medium having stored thereon instructions, that when executed by a computing platform, result in communicating with remote base stations in site selection diversity transmit (SSDT) mode wherein
communication state parameters, including signal to interference ratio (SIR) target values and carrier frequency offset estimates, are maintained for base stations of an active set, and at least one of the communication state parameters including the SIR target value associated with a selected base station of the active set is used for immediate communications after transfer, wherein the carrier frequency offset estimate of the selected base station is used for the immediate communications with the selected base station after the transferring and prior to the generation of an updated carrier frequency offset estimate for the selected base station, the updated carrier frequency offset estimate to be based on despreading of signals received from the selected base station after the transferring.

24. An article comprising a storage medium having stored thereon instructions, that when executed by a computing platform, result in communicating with remote base stations in site selection diversity transmit (SSDT) mode wherein communication state parameters for base stations of an active set are maintained, wherein the communication state parameters are used for communicating with one of the base stations of the active set selected for transferring communications, wherein carrier frequency offset estimates are maintained for the base stations of the active set during communications with a primary base station, and wherein when transferring communications to a selected base station of the active set, a carrier frequency for communications with the selected base station is corrected using the carrier frequency offset estimate maintained for the selected base station prior to the generation of an updated carrier frequency offset estimate for the selected base station, the updated carrier frequency offset estimate to be based on despreading of signals received from the selected base station after the transferring.

25. The article of claim 24 wherein the instructions, when further executed by the digital computing platform result in maintaining signal to interference ratio (SIR) target values for base stations of an active set, wherein the SIR target value is used for communications with the selected base station.

* * * * *

UNITED STATES PATENT AND TRADEMARK OFFICE
CERTIFICATE OF CORRECTION

PATENT NO. : 7,280,842 B2  Page 1 of 1
APPLICATION NO. : 10/322365
DATED : October 9, 2007
INVENTOR(S) : Lev Smolyar et al.

It is certified that error appears in the above-identified patent and that said Letters Patent is hereby corrected as shown below:

Column 2, Line 2    Delete "ration" and insert -- ratio --
Column 4, Line 60   Delete "may" after "210"

Signed and Sealed this

Twenty-ninth Day of April, 2008

JON W. DUDAS
*Director of the United States Patent and Trademark Office*